July 20, 1965 J. MULLER 3,195,295
IMMISCIBLE FLUIDS SEPARATOR
Filed Nov. 6, 1962
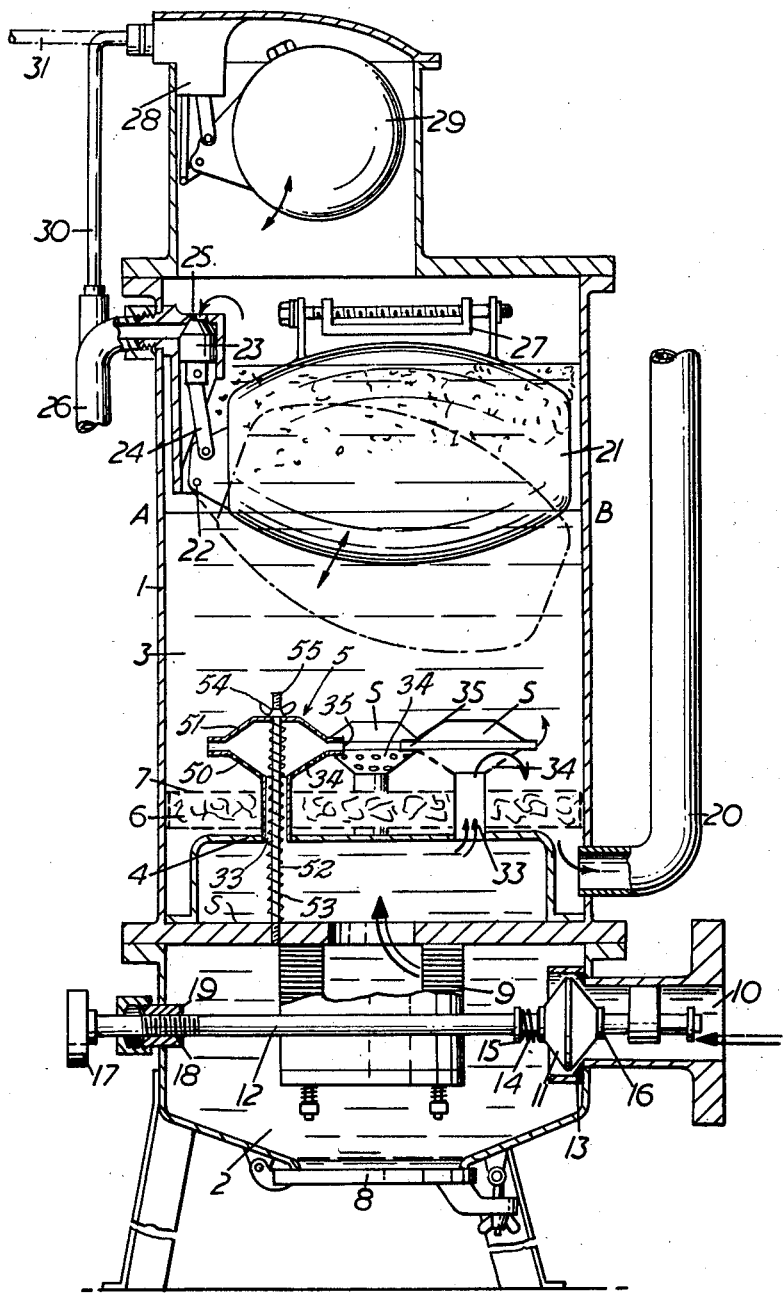
Inventor
JACQUES MULLER
By *Imirie and Smiley*
Attorneys United States Patent Office 3,195,295
Patented July 20, 1965

3,195,295
IMMISCIBLE FLUIDS SEPARATOR
Jacques Muller, 123 Ave. du General de Gaulle,
La Garenne-Colombes, France
Filed Nov. 6, 1962, Ser. No. 235,749
Claims priority, application France Nov. 10, 1961,
878,516
7 Claims. (Cl. 55—166)

This invention relates to apparatus for filtering and separating immiscible liquids.

It often occurs that liquids which are normally immiscible, in the sense that one will not disperse or diffuse within the other, are closely combined in the form of intermixed droplets or emulsions, and their separation in such a manner that both liquids are recovered in usable form and substantially uncontaminated by the other involves difficulty. For example oil, or some other petroleum product, may be mixed with water.

One object of the present invention is to provide apparatus for filtering and separating immiscible liquids in which a high degree of separation and purification of both liquids may be achieved.

Another object is to provide a combined filtering and separating apparatus for immiscible liquids in which the liquids are first passed through a filter of the annular micro-groove type, in which foreign matter is removed and a first stage of separation occurs, and the liquids are then passed into diffusers in which they are further separated, the heavier liquid being passed through a relatively coarse type of filter before finally passing to an outlet.

A further object is to provide filtering and separating apparatus for immiscible liquids containing filters and diffusers of a novel type connected in series, there being a low level outlet for the heavier liquid and a higher level outlet for the lighter liquid, the outlet for the lighter liquid being controlled by a valve actuated by a float capable of being raised by the heavier liquid to close the valve, so that there is no possibility of the heavier liquid reaching the lighter liquid outlet.

Still another object is to provide filtering and separating apparatus containing annular micro-grooove filters and special diffusing elements and having three outlets, an outlet at a low level for the heavier liquid, a float-controlled outlet for the lighter liquid at an intermediate level, and a float-controlled outlet for gases at an upper level.

Still a further object is to provide filtering and separating apparatus which is particularly adapted for the cleaning of tanks, reservoirs or the like containing mineral oil or mineral oil products which have become contaminated with water.

One embodiment of the invention will now be particularly described, by way of example, with reference to the accompanying drawing which shows a vertical section of the complete apparatus.

In the said embodiment there is provided a vertical cylindrical container 1 divided into an upper compartment 3 and a lower compartment 2 by a horizontal partition 4. The partition 4 supports a plurality of diffusing elements 5. Each diffusing element consists of a lower tubular inlet portion 33 which is open to outlets from filters which will be referred to later. Each diffusing element is provided at its upper end with a lower inverted hollow conical portion 50 and an upper hollow conical portion 51. The lower inverted conical portion is provided with holes 34 which are of small size so that when liquid is forced through them an extruding effect is produced which, as hereinafter explained, helps to separate the two liquids. At the junction of the inverted lower conical portion and the upper conical portion a slot 35 is provided and provision is made to adjust the width of this slot so that when the mixture of liquid is expressed through the slot a further separating effect is produced by lamination and stratification.

Such adjustment may be accomplished for example by moving the upper conical portion 51 toward and away from the lower conical portion 50. To this end a rod 52 is embedded at its lower end in shelf S extending axially through the inlet 33 of an associated diffuser 5 and axially through the upper conical portion 51. A coil spring 53 encompasses rod 52 and reacts against the undersurface of conical portion 51 to urge it upwardly, a winged nut 54 screwed on the threaded end 55 of rod 52 permitting ready adjustment of the width of slot 35. Such slot adjusting means is conventional in the art and per se, forms no part of the present invention.

Resting on the partition 4 is a pad 6 composed of felt, or of a metal wool, or vegetable or plastic fibres, or other material which will form a filter, the pad being held clamped by a grid or perforated plate 7.

In the lower compartment 2 a plurality of filter elements 9 of the annular micro-groove type are fixed to shelf S below the partition 4. These micro-groove filters, which are in themselves known, each consist of a stack of discs having central holes and provided on one or both faces with micro-grooves. The micro-grooves run from the outer periphery to the inner periphery of the face of the disc and are conveniently in the shape of an equilateral triangle, two sides of the triangle being formed by the sides of the groove and the third side being formed by the face of the adjacent disc. The size of the micro-grooves depends, of course, on the nature of the liquids to be separated and the type of foreign bodies to be filtered out. For separating petroleum products of medium viscosity from water the length of one side of the equilateral triangle may be around 25 microns (1 micron is one-thousandth part of a millimetre and equals 0.000039" or 39-millionths of an inch). The grooves are preferably formed so that this dimension is held at the outer periphery of the disc and the grooves deepen progressively towards the centre of the disc to ensure that any matter small enough to penetrate the entrance to the groove cannot be jammed at a point inside the groove since the groove becomes progressively wider. The stack of discs forming one filter is held together by springs.

The lower compartment contains an inlet 10 adapted for connection to a pipe from the tank or vessel containing the liquids, and the flow of the liquid is controlled by means of a valve 11 freely movable on a stem 12, which stem is itself movable in its axial direction by means of a screw thread 18 engaged by a nut 19 having a stuffing box formed at its outer end to prevent leakage. The other end of the stem 12 slides in an outboard bearing formed inside the inlet 10. The stem 12 is provided at its end adjacent the screw thread 18 with a knob 17 so that it may be rotated manually to screw it through the nut 19. The inner part of the inlet 10 is formed with a valve seating 13 for the valve 11 and the stem 12 is provided with two shouldered portions 15 and 16 and a spring 14 to urge the valve 11 towards the seating 13. Thus, by screwing the stem 12 by means of the knob 17 in the direction to move the valve 11 towards the seating 13, the restriction offered to the flow of the mixture through the inlet 10 may be initially adjusted, and after adjustment the pressure within the container is automatically regulated by the spring 14.

At the lower end of the upper compartment 3 a discharge pipe 20 is provided, to enable the heavier liquid (such as water) to be discharged.

At the lower end of the lower compartment is a flap 8 which is hinged to the bottom of the lower compartment and is normally held in a closed position by means of a lug and a fly nut. The flap 8 may be opened to allow sediment and foreign matter removed in filtering to discharge from the lower compartment 2 from time to time.

Near the upper end of the upper compartment an outlet 25 is provided for the lighter liquid (such as a petroleum product) and a pipe 26 may be connected to this outlet. The outlet fitting is provided with a first valve 23 coupled by a rod 24 to a first float 21 which is pivoted at one end on a pivot 22. The float 21 is provided with an adjustable weight 27 so that the position of its centre of gravity with respect to the pivot 22 may be varied for a purpose which will be described later.

At the upper end of the container 1 is an outlet for gas which may accumulate in the upper part of the container. The outlet 28 contains a second valve (not shown) which is coupled to a second pivoted float 29. The outlet 28 may be connected by a pipe 30 to the lighter liquid pipe 26 or by means of a pipe 31 to a storage vessel or a discharge orifice located at a safe distance from the apparatus, to avoid any danger of explosion.

In operation, the mixture of liquids, gas and foreign matter to be separated are fed under pressure to the inlet 10, and the valve 11 is adjusted by means of the knob 17 to provide desired flow rate and pressure conditions in the container. The mixture is forced through the annular micro-groove filters 9. These filters 9 prevent any foreign matter larger than the size of the micro-grooves from passing, and such foreign matter eventually falls to the bottom of the container 1, from which it may later be evacuated by opening the flap 8. The liquids passing through the micro-grooves are demulsified and a first separation of the two liquids takes place, both liquids passing through the filter. The liquids then move upwardly and into the diffusers 5, where some of the liquids are forced through the holes 34 in the lower inverted hollow conical portions and some of the liquids are forced through the slots 35 around the perimeters of the diffusers 5. It will be understood that after the initial separation of the liquids in the filters 9 droplets of the two liquids may still be stuck together or agglutinated, but they are tending to separate more and more as they pass upwardly and into the diffusers 5. Accordingly the liquid passing through the holes 34 tends to be mainly the heavier liquid and the extruding action as the liquid is forced through the holes 34 tends to dissociate any of the lighter liquid still being carried by the heavier liquid, to produce further separation. Again the liquid passing through the peripheral slots in the diffusers 5 tends to be mainly the lighter liquid, but still carrying a small amount of the heavier liquid, and the separation of the remainder of the heavier liquid is promoted by the laminating or stratifying action as the liquid is forced in a layer in the horizontal direction through the slots 35.

The heavier liquid passes downwardly through the pad 6, the fibres of which, by their retarding effect and adhesion, retain the molecules of the lighter liquid still being carried, so that these molecules of lighter liquid collecting therein and coalescing together acquire sufficient size to lift themselves upwardly clear of the pad 6, and the heavier liquid leaving through the pipe 20 is highly purified and free from the lighter liquid.

The lighter liquid in the upper compartment 2 rises and eventually leaves through the pipe 26.

If, for any reason, the level of the heavier liquid should rise to such a height that there is some danger of the heavier liquid being carried into the light liquid outlet 25, this level being indicated by the line AB in the drawing, the heavier liquid will carry the float 21 upwardly and thereby close the valve 23. Since new liquid is being continuously supplied under pressure through the inlet 10 and valve 11, the heavier liquid will continue to be displaced through the pipe 20 and more of the lighter liquid will pass into the compartment 3 until the level of the heavier liquid in the compartment 3 falls to the point at which the valve 23 is re-opened.

The gas present in the mixture is also separated from the mixture in the filter 9 and this accumulates in the upper part of the container. If the amount of gas in the upper part of the container reaches such a volume that the level of the lighter liquid falls below a predetermined point, the float 29 falls and opens the valve 28, which allows the gas to escape.

The centre of gravity of the float 21 may be adjusted with respect to the pivot 22 by means of a weight 27 which is adjustable as to position by screwing it along a threaded rod. This enables the operation of the float to be adjusted with respect to the difference in density of the two liquids, so that the float 21 is only raised by the presence of the heavier liquid.

I claim:

1. Apparatus for filtering and separating a mixture of immiscible liquids of different densities, foreign matter and gases, comprising a container divided by a horizontal partition into upper and lower compartments, an inlet in the lower compartment through which the mixture may be introduced under pressure, a plurality of filters of the annular micro-groove type in said lower compartment to remove foreign matter and to produce an initial separation of the liquids, a plurality of diffusing elements mounted on said partition, each diffusing element comprising an inlet and a receptacle having downwardly directed holes through which said liquids may be extruded to produce further separation and a narrow horizontal slot around its perimeter through which said liquids may be expressed and further separated by lamination and stratification, the outlets of said micro-groove filters communicating with the inlets of said diffusing elements through said partition, an outlet for the heavier liquid adjacent the bottom of said upper compartment, a filter pad above said partition and below the level of said diffusing elements through which said heavier liquid may flow to said heavier liquid outlet, an outlet for the lighter liquid near the top of said upper compartment, a first valve to open and close the lighter liquid outlet, a first float coupled to said first valve to close said lighter liquid outlet if the level of the heavier liquid rises above a predetermined point, an outlet for gases at the top of said upper compartment, a second valve to control the gas outlet, and a second float coupled to said second valve so disposed that if the level of said lighter liquid in the upper part of said upper compartment falls below a predetermined level due to the accumulation of gases said second valve is opened to permit said gases to escape.

2. Apparatus as claimed in claim 1 comprising a manually adjustable valve in said inlet to control the flow rate and the pressure in said container.

3. Apparatus as claimed in claim 2 in which said manually adjustable valve is loaded by a spring, whereby the flow and pressure conditions may be preset manually and then maintained automatically.

4. Apparatus as claimed in claim 1 comprising an adjustable weight on said first float to enable the action of said first float to be adjusted in accordance with the relative densities of the liquids being treated.

5. Apparatus as claimed in claim 1 comprising a flap at the bottom of said container which may be opened to permit removal of foreign matter held by said annular micro-groove filters.

6. Apparatus as claimed in claim 1 in which the vertical width of said peripheral slot is adjustable.

7. Apparatus for filtering and separating a mixture of immiscible liquids of different densities, foreign matter and gases, comprising a container divided by a horizontal partition into upper and lower compartments, an inlet in said lower compartment through which the mixture may be introduced under pressure, a manually adjustable valve in said inlet to control the flow rate and the pressure in said container, a spring on said manually adjustable valve to provide continued automatic control after initial manual setting, a plurality of filters of the annular micro-groove type in said lower compartment to remove foreign matter and produce initial separation of the liquids, a plurality of diffusing elements mounted on said partition, each diffusing element comprising an inlet and a receptacle having downwardly directed holes through which said liquids may be extruded to produce further separation and a narrow horizontal slot around its perimeter through which said liquids may be expressed and further separated by lamination and stratification, means to adjust the vertical width of said horizontal slots, the outlets of said annular micro-groove filters communicating with the inlets to said diffusing elements through said partition, an outlet for the heavier liquid adjacent the bottom of said upper compartment, a filter pad above said partition and below the level of said diffusing elements through which the heavier liquid may flow to said heavier liquid outlet, an outlet for the lighter liquid near the top of said upper compartment, a second valve to open and close the lighter liquid outlet, a first float coupled to said second valve to close said lighter liquid outlet if the level of the heavier liquid rises above a predetermined point, an outlet for gases at the top of said upper compartment, a third valve to control the gas outlet, and a second float coupled to said third valve to open said third valve if the level of the lighter liquid in said upper compartment falls below a predetermined point due to the accumulation of gases.

References Cited by the Examiner

UNITED STATES PATENTS

| | | | |
|---|---|---|---|
| 2,523,793 | 9/50 | Vance | 210—295 X |
| 2,701,620 | 2/55 | Crawford | 55—166 |
| 2,966,269 | 12/60 | Allen | 210—314 X |

REUBEN FRIEDMAN, *Primary Examiner.*

HARRY B. THORNTON, HERBERT L. MARTIN,
*Examiners.*